USO09772211B2

(12) United States Patent
Lenk

(10) Patent No.: US 9,772,211 B2
(45) Date of Patent: Sep. 26, 2017

(54) FILL LEVEL GAUGE WITH A RINSING DEVICE

(71) Applicant: VEGA Grieshaber KG, Wolfach (DE)

(72) Inventor: Fritz Lenk, Schiltach (DE)

(73) Assignee: VEGA GRIESHABER KG, Wolfach (DE)

( * ) Notice: Subject to any disclaimer, the term of this patent is extended or adjusted under 35 U.S.C. 154(b) by 625 days.

(21) Appl. No.: 14/255,228

(22) Filed: Apr. 17, 2014

(65) Prior Publication Data

US 2014/0332032 A1 Nov. 13, 2014

(30) Foreign Application Priority Data

May 7, 2013 (EP) ..................................... 13166916

(51) Int. Cl.
| | | |
|---|---|---|
| *G01F 23/28* | (2006.01) | |
| *G01F 23/00* | (2006.01) | |
| *A47L 15/42* | (2006.01) | |
| *A47L 15/00* | (2006.01) | |
| *A47L 15/46* | (2006.01) | |
| *G01F 23/296* | (2006.01) | |

(52) U.S. Cl.
CPC ............. *G01F 23/28* (2013.01); *G01F 23/00* (2013.01); *A47L 15/0023* (2013.01); *A47L 15/0055* (2013.01); *A47L 15/4244* (2013.01); *A47L 15/46* (2013.01); *A47L 2401/09* (2013.01); *A47L 2401/34* (2013.01); *G01F 23/2968* (2013.01)

(58) Field of Classification Search
CPC ...................................................... G01F 23/28
See application file for complete search history.

(56) References Cited

U.S. PATENT DOCUMENTS

2005/0092081 A1* 5/2005 Spanke ............... G01F 25/0061
73/290 V
2007/0085752 A1* 4/2007 Kienzle ................. G01F 23/284
343/840

FOREIGN PATENT DOCUMENTS

| DE | 10 2004 033 033 A1 | 7/2004 | |
|---|---|---|---|
| EP | 1 480 021 A2 | 5/2004 | |
| EP | 2 202 536 A2 | 12/2009 | |
| WO | WO 2006/063930 A1 | 11/2005 | |
| WO | WO 2006063930 A1 * | 6/2006 | ........... G01F 23/284 |
| WO | WO 2008/006391 A1 | 7/2006 | |
| WO | WO 2008006391 A1 * | 1/2008 | ........... G01F 23/284 |

* cited by examiner

*Primary Examiner* — Peter Macchiarolo
*Assistant Examiner* — Timothy Graves
(74) *Attorney, Agent, or Firm* — Juneau & Mitchell

(57) ABSTRACT

A fill level gauge is described with a rinsing device for rinsing a fill level sensor, comprising a sensor for detecting a measuring signal as well as a measurement device connected to the sensor for determining a measurement from the detected measuring signal, with the measurement device being connected to a comparator for comparing the measurement determined with a first reference value at a predetermined condition of comparison, which comprises a control signal output for issuing a control signal, with the rinsing device being coupled to the control signal output or being connected to the control signal output such that, when the condition of comparison is fulfilled, the control signal output transmits a control signal to the rinsing device for activating said rinsing device so that the rinsing device is activated.

23 Claims, 3 Drawing Sheets

FILL LEVEL GAUGE WITH A RINSING DEVICE

CROSS REFERENCE TO RELATED APPLICATIONS

This patent application claims priority European Patent Application 13 166 916.0, filed on May 7, 2013.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The present invention relates to a fill level gauge with a rinsing device for rinsing a fill level sensor.

Background of the Invention

The current state of knowledge is as follows.

Fill level gauges for measuring the fill level of liquids and bulk goods in a container are known from prior art and widely used in industrial environments. The selection of the suitable measuring method essentially depends on whether liquids or bulk goods are processed.

For example, the detection of a fill limit using microwaves is based on the transceiver principle. Microwave pulses emitted by a transmitter and passing through an empty container are registered by a receiver; however, in a full container they are absorbed by the medium at least partially. The exceeding of a limit can be concluded from the ratio of the measured pulse rates.

Radar fill level gauges work with radar sensors. Here, high-frequency radar pulses are emitted by an antenna and reflected by the surface of the filling material. The travel time of the reflected radar pulse is directly proportional to the distance traveled. With known container geometries, the fill level can be calculated from this.

In order to determine the height of the fill level in a container, the fill level sensor is usually directly aligned to the interior of the container. The measurements are performed while the container is being filled.

A problem arising here during the measurement of the fill level is the soiling of the sensor by dust, for example, which is raised during the filling process of the container and adheres to the sensor. The measuring of the fill level in coking plants is a good example, here. Such soiling changes the signal which is detected. When the soiling is excessive, the signal cannot be detected any longer, and the height of the fill level can no longer be determined. In such cases in prior art, an error message is issued which indicates that a signal is no longer being received. Potential causes for the error are then listed, e.g. a defective antenna, an interrupted signal line, or excessive soiling of the antenna.

A similar problem may also occur when the detector overheats. This case may arise, for example, when the detector is used in environments in which the temperature is very high, as is the case in smelters, for example.

When the detector overheats, this may also lead to the measurement becoming falsified, and thus measuring cannot reliably be performed any more.

For these reasons, rinsing and/or cooling connections are frequently provided for in radar fill gauges, for example, with which the fill level sensor can be rinsed and/or cooled.

DE 10 2004 033 033.6, for example, discloses such a fill level gauge—antenna arrangement for radar fill level gauges with a pipeline system for guiding a medium through it, which may be gaseous or liquid, with the antenna arrangement being embodied for supplying a coolant to the components of the antenna which heat up.

Such fill level gauges are usually rinsed continuously with a cooling or rinsing fluid in order to avoid interruptions. In order to ensure an uninterrupted operation of the fill level gauge, a large quantity of rinsing and/or cooling fluid is consumed.

Accordingly, the objective of the present invention is to provide fill level gauges not showing these disadvantages.

This objective is attained in a fill level gauge according to claim 1, as well as a method for rinsing a fill level sensor according to claim 21. Advantageous embodiments are disclosed in the dependent claims.

BRIEF SUMMARY OF THE INVENTION

In a preferred embodiment, a fill level gauge comprising a rinsing device for rinsing a fill level sensor, further comprising a sensor for detecting a measuring signal as well as a measurement device connected to the sensor for determining a measurement from the detected measuring signal, wherein the measurement device is connected to a comparator for comparing the determined measurement with a first reference value at a predetermined condition of comparison, which comprises a control signal output for issuing a control signal, wherein the rinsing device is coupled or connected to the control signal output so that when the condition of comparison is fulfilled the control signal output transmits a control signal to the rinsing device to activate said rinsing device so that the rinsing device is activated.

In another preferred embodiment, the fill level gauge as described, wherein the rinsing device remains activated for a predetermined period of time when the control signal is provided to activate the rinsing device at the control signal output.

In another preferred embodiment, the fill level gauge as described, further comprising wherein, when the condition of comparison is fulfilled, a hysteresis is activated so that the rinsing device remains activated when the measurement is within the hysteresis range, with the hysteresis range being defined by the first reference value and a second reference value which is outside the value range in which the conditions of comparison are fulfilled.

In another preferred embodiment, the fill level gauge as described, wherein the sensor is a fill level sensor.

In another preferred embodiment, the fill level gauge as described, wherein the fill level sensor is a sensor for receiving and detecting the echo signal of a high-frequency pulse, with the measurement being a value calculated from the detected echo signal.

In another preferred embodiment, the fill level gauge as described, wherein the measurement and/or the first reference value are a function of the signal/noise ratio of the echo signal.

In another preferred embodiment, the fill level gauge as described, wherein the first reference value is a function of the amplitude of the high-frequency pulse emitted.

In another preferred embodiment, the fill level gauge as described, wherein the first reference value and/or the second reference value are determined by the interval between the high-frequency pulse and the echo signal.

In another preferred embodiment, the fill level gauge as described, wherein the first reference value and/or the second reference value are determined from the amplitude of the echo signal received at the time the fill level gauge is activated.

In another preferred embodiment, the fill level gauge as described, wherein the first reference value and/or the second reference value are values determined from a saved reference echo curve.

In another preferred embodiment, the fill level gauge as described, wherein the sensor is a temperature sensor for measuring the temperature of the fill level sensor.

In another preferred embodiment, the fill level gauge as described, wherein the measurement is a temperature measurement and the first reference value is a first temperature limit, and further comprising wherein a control signal is provided at the control signal output when the temperature measurement is greater than the first temperature limit.

In another preferred embodiment, the fill level gauge as described, wherein the rinsing device is deactivated when the temperature measured falls below a predetermined second temperature limit, which is lower or maximally equivalent to the first temperature limit.

In another preferred embodiment, the fill level gauge as described, wherein the fluid is gaseous, preferably nitrogen, air, or an inert gas.

In another preferred embodiment, the fill level gauge as described, wherein the fluid is a cooling fluid for cooling the fill level sensor or a cleaning fluid for cleaning the fill level sensor.

In another preferred embodiment, the fill level gauge as described, wherein the rinsing valve is integrated in the fill level gauge.

In another preferred embodiment, the fill level gauge as described, wherein the control signal output is coupled via a wireless connection to transmit control signals to the rinsing device.

In another preferred embodiment, the fill level gauge as described, further comprising wherein, when the conditions of comparison are fulfilled, several rinsing intervals are provided, with the duration of each individual rinsing interval and/or the duration of the intervals between the rinsing intervals being predetermined.

In another preferred embodiment, the fill level gauge as described, wherein the rinsing device is deactivated and an error message is issued when the conditions of comparison after a predetermined number of rinsing intervals or after a predetermined rinsing duration are still fulfilled.

In another preferred embodiment, the fill level gauge as described, further comprising wherein additional rinsing intervals are provided for rinsing the fill level sensor, with the duration of the rinsing process being predetermined.

In another preferred embodiment, method for rinsing a fill level sensor with the fill level gauge as described, comprising the following processing steps:

a) Predetermination of a first reference value, b) Measurement of a signal with a sensor, c) Determination of a measurement from the signal, d) Comparison of a measurement with the first reference value, and e) Rinsing of the fill level sensor when a condition of comparison is fulfilled.

In another preferred embodiment, the method as described, wherein a second reference value is determined.

In another preferred embodiment, the method as described, further comprising wherein, after comparing the measurement with the first reference value, it is checked if the rinsing device is activated or deactivated, with the measurement being compared to the second reference value when the rinsing device is activated.

In another preferred embodiment, the method as described, wherein the rinsing device is deactivated when the conditions of comparison are not fulfilled and either the amount of the measurement exceeds the amount of the second reference value when the amount of the second reference value is greater or equivalent to the amount of the first reference value, or when the amount of the first measurement falls below the amount of the second reference value when the amount of the second reference value is below or equivalent to the amount of the first reference value, or when a predetermined time period has expired since the activation of the rinsing device.

In another preferred embodiment, the method as described, wherein the activated rinsing device is deactivated when the control signal output provides a control signal with which the rinsing device is deactivated or when the control signal output provides no control signal.

DETAILED DESCRIPTION OF THE INVENTION

Figure 1:
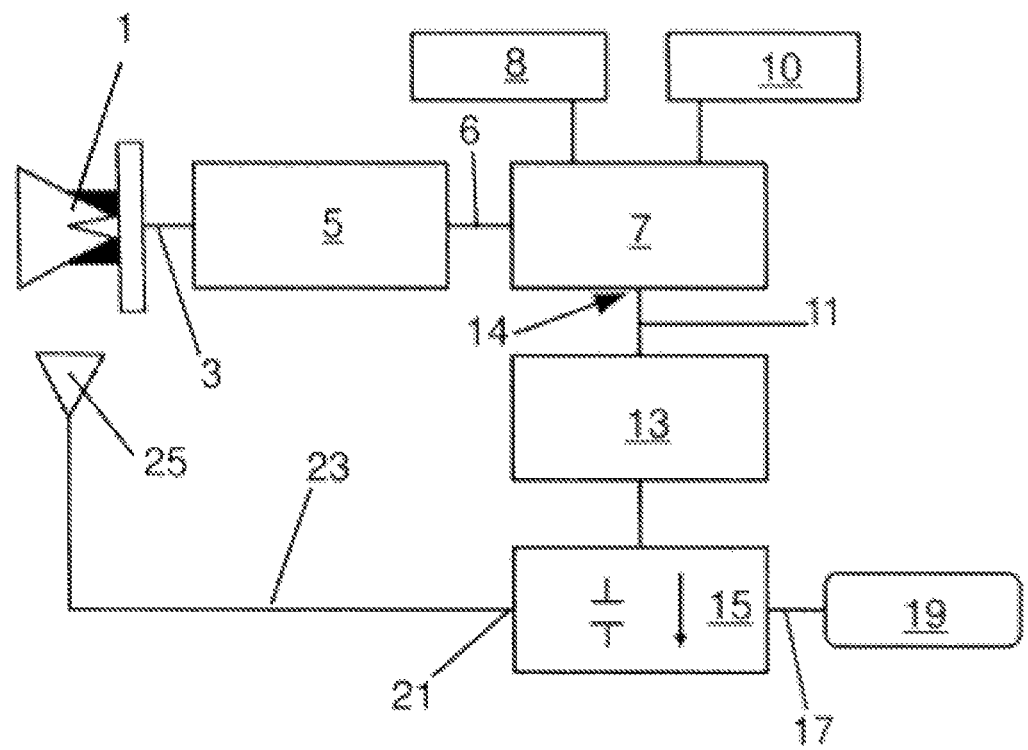
FIG. 1 is a line drawing evidencing a schematic illustration of a fill level sensor with a rinsing device.

According to the invention, the fill level gauge with a rinsing device for rinsing a fill level sensor comprises a sensor for detecting a measuring signal, as well as a measurement determination [device] connected to the sensor for determining a measurement from the detected measuring signal, with the measurement determination [device] being connected to a comparator for comparing the determined measurement with a first reference value at predetermined conditions for comparison. The comparator comprises a control signal output for emitting a control signal, and the rinsing device is coupled or connected to the control signal output in such a way that when the conditions of comparison are fulfilled the control signal output transmits a control signal for activating the rinsing device to said rinsing device and the rinsing device is activated.

This way, rinsing only occurs when it is necessary, which largely reduces the consumption of rinsing fluid.

The rinsing device advantageously comprises a valve control which is coupled or connected to the control signal output. A valve is connected to the valve control which can control it, showing a first connection for a fluid supply and a second connection. The second connection is advantageously connected to a rinsing line for rinsing the fill level sensor, with its other end showing a rinsing aperture which is aligned, for example, to the fill level sensor or integrated in the fill level sensor.

The control signal output can provide a control signal to the valve control for opening the valve when either the amount of the measurement is lower than the amount of the first predetermined reference value—with no control signal being provided for opening the valve as long as the amount of the measurement is higher than the amount of the first reference value—or when the amount of the measurement is higher than the amount of the first reference value, with no control signal for opening the valve being provided in this case as long as the amount of the measurement is lower than the amount of the first reference value. This way, the conditions of comparison can be defined such that, when they are true, the rinsing device is activated, and when they are not true, the rinsing device is not activated.

In fill level gauges provided with an error output, in an alternative embodiment here the output may also be used for issuing the error message, (in order) to activate the rinsing device. When an error signal is issued which indicates to the operator that the fill level sensor needs cleaning or cooling, this error signal may simultaneously be used as a control signal for activating the rinsing device.

When the control signal for activating the rinsing device is provided at the control signal output, it is advantageous for the rinsing device to remain activated for a predetermined period of time so that the fill level sensor can be rinsed for a sufficiently long time. This way, sufficient cleaning and cooling, respectively, of the fill level sensor can be ensured.

One variant provides that a hysteresis is activated when the conditions of comparison are fulfilled so that the rinsing device remains activated if it had been activated earlier and if the measurement is within a hysteresis range, with the hysteresis range being defined by the first reference value and a second reference value which is outside the range of values in which the conditions of comparison are fulfilled. For example, the rinsing device is only deactivated after activation when the conditions of comparison are no longer fulfilled and additionally either the amount of the measurement is higher than the amount of a second predetermined reference value which is greater than the amount of the first reference value, or—if the amount of the measurement is lower than the amount of a second predetermined reference value—which is lower than the amount of the first reference value.

Similar to the predetermining of a certain period for the rinsing process, the activation of a hysteresis may also ensure that sufficient cleaning and sufficient cooling, respectively, of the fill level sensor occurs.

The sensor for detecting the measurement signal may even be the fill level sensor itself. This way, an additional sensor which is exclusively responsible for the rinsing intervals may be omitted.

The fill level sensor is advantageously a sensor for receiving and detecting echo signals of a high-frequency pulse, with the measurement being a calculated value from the detected echo signal.

The measurement and/or the first reference value may, for example, be a function of the signal/noise ratio of the echo signal. For example, it may be determined as a condition that the rinsing device is activated when the echo signal is not higher than the noise signal by at least a certain factor, because it then can be assumed that the sensor is soiled or that the temperature of the sensor is too high for the measurement, for example. Due to the fact that the fill level sensor is preferably aligned to the interior of the container in order to determine the height of the fill level in said container, and thus is removed from direct visual inspection, conclusions can be drawn via the change of the detected signal regarding the degree of soiling or the temperature of the fill level sensor.

The signal/noise ratio, also called noise distance or signal noise distance, is a measure for the technical quality of a useful signal which is blanketed by noise. It is defined as the ratio of the mean power of the useful signal in reference to the mean noise power of the interfering signal.

The first reference value may alternatively or additionally be determined as a function of the amplitude of the emitted high-frequency pulse, for example. It may be required here that the amplitude of the echo signal should at least amount to a certain percentage of the amplitude of the emitted high-frequency pulse. If this is not the case, then the rinsing process can be initiated. Such a relation causes a coupling of the first reference value to the signal strength of an emitted high-frequency pulse. This way it can be excluded, for example, that the activation of the rinsing device is prevented by the fact that the high-frequency pulse is emitted with a higher power.

It is also possible that the first reference value and/or the second reference value are determined by the temporal distance between the high-frequency pulse and the echo signal. This way, a reference value can be determined depending on the fill level of the container. The first reference value can here be taken from a value table which, for example, has been determined in advance as a function of the fill level of the container. This is sensible in all cases in which the amplitude of the echo signal is largely correlated to the fill level of the container.

An alternative possibility for determining the first and/or second reference value is, for example, to determine the amplitude of the received echo signal at the time of the start of operation of the fill level gauge and, for example, to save the corresponding echo curve with its values. The first and/or second reference value can then be referenced to the saved echo curve or the defined amplitude of the received echo signal at the time of the start of operation.

The first reference value and/or the second reference value may be a value determined from a saved reference echo curve, for example. Insofar as it can be assumed that at the time of the start of operation the fill level sensor was not soiled, the level of soiling of the fill level sensor can therefore be deduced from any change of the measurements in reference to the saved values.

Of course, the sensor may also be a temperature sensor for measuring the temperature of the fill level sensor. The measurement can then advantageously be a temperature measurement and the first reference value a first temperature limit. Then, a control signal is provided at the control signal output when the temperature measurement is greater than the first temperature limit. This activates the rinsing device. When the measured temperature falls below a predetermined second temperature limit which is lower or maximally equivalent to the first temperature limit, the rinsing device may be deactivated again, for example.

The fluid for cleaning and/or cooling the fill level sensor is preferably gaseous, for example nitrogen, air, or an inert gas. It may also be a rapidly evaporating liquid, though. However, here it is important that the fluid used leaves no residue on the fill level sensor. The fluid may represent a cooling fluid for cooling the fill level sensor or also a cleaning fluid for cleaning the fill level sensor. The rinsing valve may be connected directly to the fill level gauge or integrated in said fill level gauge. The control signal output may be coupled via a wireless connection to transmit the control signal to the rinsing device or it may also be connected directly to the rinsing device.

In order to perform a thorough rinsing process when the conditions of comparison are fulfilled, several rinsing intervals may also be provided, where preferably the duration of each individual rinsing interval and/or the duration of the time interval between the rinsing intervals can be predetermined. The number of the predetermined rinsing intervals may also be predetermined.

When the conditions of comparison are still fulfilled, after a predetermined number of rinsing intervals or after a predetermined rinsing duration for example, an error message may still be issued and the rinsing device may be deactivated in spite of the conditions of comparison being fulfilled.

In order to optimize the results, additional rinsing intervals may be further provided for rinsing the fill level sensor, which are executed, for example, independently of the conditions of comparison being given or not being given, or which can be performed depending on the temporal distance between the conditions of comparison being given at earlier points of time.

The method for rinsing a fill level sensor may be performed as follows: After the first reference value has been predetermined, a signal is measured with the sensor. Then, a measurement is determined from the signal. After this, the measurement is compared to the first reference value, and when the predetermined condition of comparison is fulfilled, the rinsing device is activated and the fill level sensor is rinsed. Prior to and during this process a second reference value can be determined or predetermined. After the comparison of the measurement with the first reference value it can be checked if the rinsing device is activated or deactivated, with the measurement being compared to the second reference value when the rinsing device is activated.

The activated rinsing device is preferably deactivated when the reference conditions are no longer fulfilled and simultaneously either the amount of the measurement exceeds the amount of the second reference value, provided that the amount of the second reference value is greater or equivalent to the amount of the first reference value, or— when the amount of the first measurement falls below the amount of the second reference value—provided that the amount of the second reference value is lower or equivalent to the amount of the first reference value, or when a predetermined temporal interval since the activation of the rinsing device has lapsed.

The activated rinsing device is deactivated as soon as the control signal outlet provides a control signal with which the rinsing device is deactivated or when the control signal output no longer provides a control signal for activating the rinsing device.

In the following, the invention is described in greater detail based on drawings.

The terms used in the following description, such as "top," "bottom," "left," and "right" and the like relate to the figures and shall not be considered limiting in any way, even when they relate to preferred embodiments.

DETAILED DESCRIPTION OF THE FIGURES

In a schematic illustration, FIG. 1 shows a radar antenna rinsing device with a fill level sensor 1, which is connected via a signal line 3 to a measurement determination device 5, in which a measurement 6 is determined from a measuring signal 2. The measurement 6 is transmitted to a storage and comparison unit 7, also called comparator. The comparator 7 comprises a first input for a first reference value 8, as well as another input for a second reference value 10 and a control signal output 11 which is connected to a valve control 13.

The measurement 6 is compared to the first reference value 8 in the comparator 7 and, depending on a predetermined condition of comparison being fulfilled or not being fulfilled, a control signal 14 is provided at the control signal output 11 for controlling a valve 15 at the valve control 13.

In order to allow controlling a valve 15, the valve control 13 is connected directly to the valve 15. The valve 15 is a valve with two operating states, namely the operating state "open" and the operating state "closed." The valve 15 comprises a first connection 17 for the supply of a fluid 19, as well as a second connection 21 which is connected to a rinsing line 23. The end of the rinsing line 23 not connected to the valve 15 comprises a rinsing aperture 25. Now, when a control signal 14 is transmitted from the control signal output 11 via the valve control 13 to the valve 15, said valve 15 is opened and the fluid 19 can get directly into the rinsing line 23 via the first connection 17 and the second connection 21 and rinse the fill level sensor 1 with the fluid 19 via the rinsing aperture 25, which is aligned to the fill level sensor 1. The fluid 19, which may represent nitrogen, air, or an inert gas, for example, can clean or cool the fill level sensor 1 this way as needed. The rinsing aperture 25 of the rinsing line 23 can also represent an aperture integrated in the fill level sensor 1, of course, this means the rinsing line 23 can be connected directly to the fill level sensor 1 or also be a part of it.

In the example described here, the fill level sensor 1 is a radar fill level sensor. Of course, it may also represent an ultrasound sensor in which the time measurement is based on measuring via ultrasound. The signal line 3 can alternatively also be connected directly to a temperature sensor 31 which measures the temperature of the fill level sensor 1 instead of to the fill level sensor 1.

Figure 2:
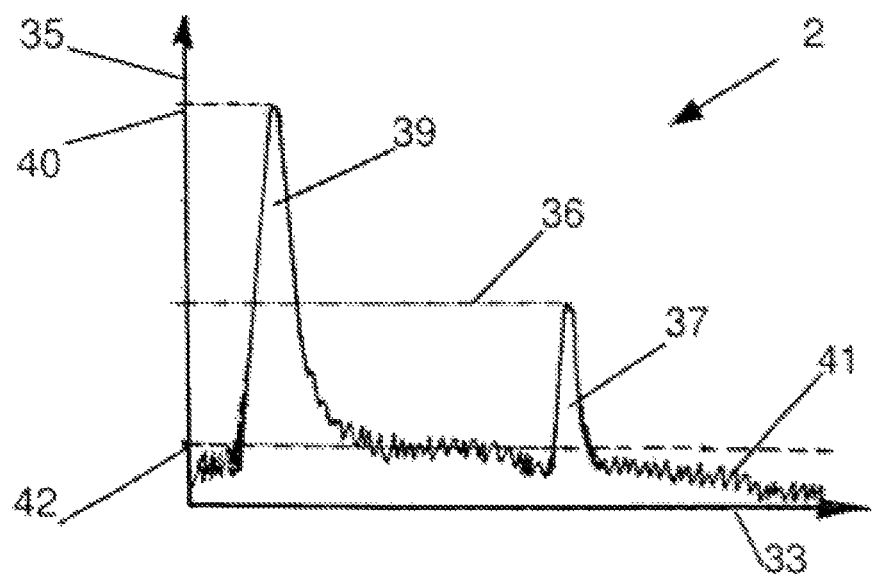
FIG. 2 is a line drawing evidencing a typical progression of the signal of a radar fill level gauge.

FIG. 2 shows a typical measuring signal 2 of a radar fill level sensor 1. In this illustration, the x-axis is selected as the time axis 33 and the y-axis as an amplitude axis 35. In order to determine the measurement 6, for example, the amplitude 36 of the echo signal 37 received by the fill level sensor 1 can be determined, which arrives at the fill level sensor 1 with a time lag in reference to the emitted high-frequency pulse 39. The amplitude 40 of the high-frequency pulse 39 can advantageously be deactivated by the fill level sensor 1 and, for example, be used for determining the first reference value 8. The fill level sensor 1 advantageously also comprises a means for emitting the high-frequency pulse. The measuring signal 2 shows noise 41 from which a noise signal value 42 can be determined, which can also be used for determining the first reference value 8.

Figure 3:
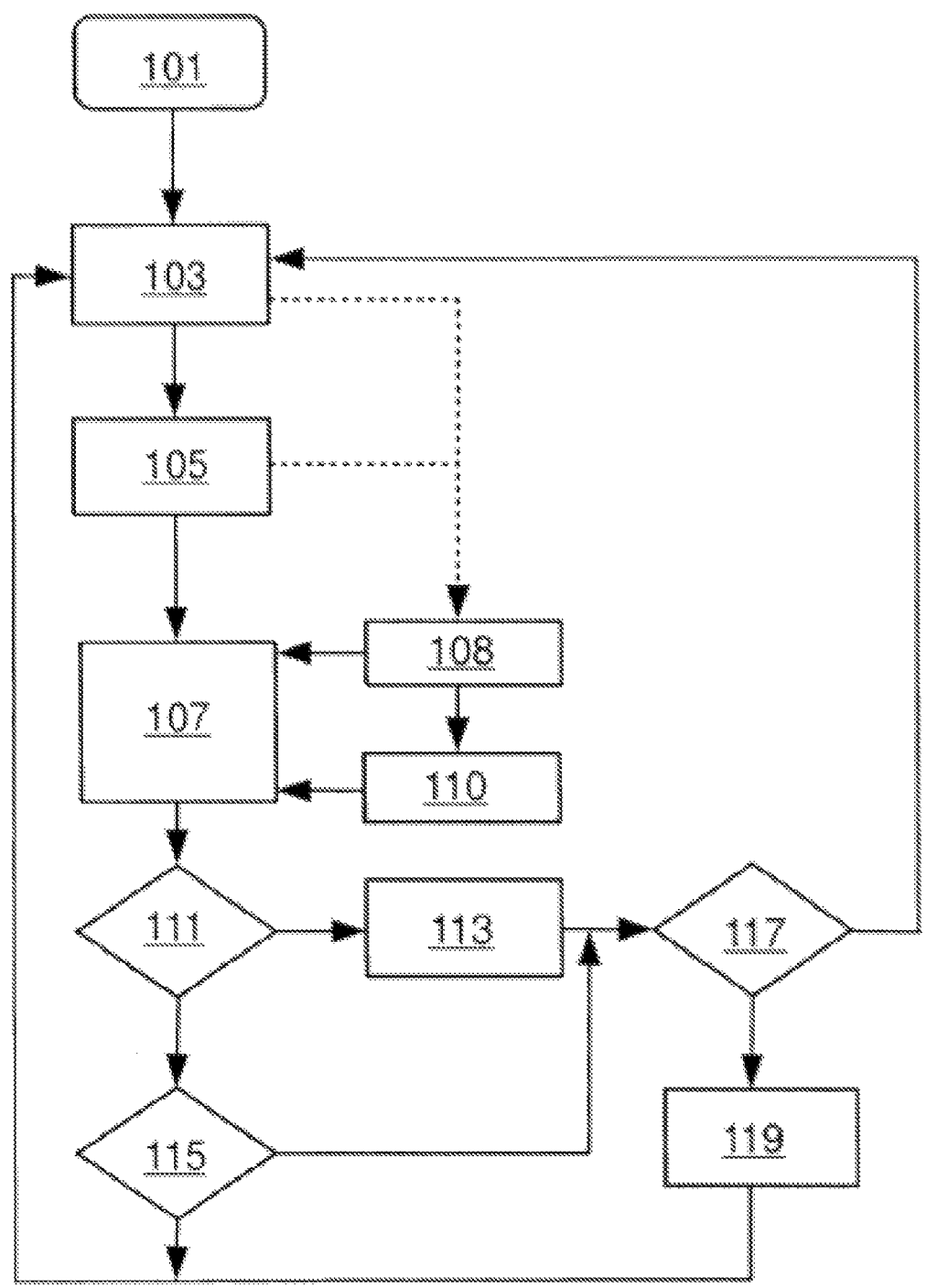
FIG. 3 is a line drawing evidencing a progression of a method for rinsing a fill level sensor.

FIG. 3 shows a diagram for explaining the functionality of a radar antenna rinsing device. After the measurements have been started in the starting block 101, the sensor signal is detected in the receiver block 103 and converted in the signal conversion block 105 into a measurement. The measurement determined from signal conversion block 105 is saved in the storage block 107.

From the sensor signal detected in the detection block 103, additionally in first reference value block 108 the first reference value 8 is determined, and this value is also saved in storage block 107. The second reference value 10 is determined from the first reference value 8 in second reference value block 110. In the present example the second reference value 10 shall be greater than the first reference value 8. The second reference value 10 is also saved in the storage block 107. Now, the saved values are forwarded to a first comparison unit 111, and a first condition of reference is checked. In the present example, the measurement 6 shall be compared to the first reference value 8 in the first comparison unit 111, and it shall be checked if the measurement 6 is lower than the first reference value 8. If this condition of comparison is fulfilled, the command is given in block 113 for opening the valve 15. If the conditions of comparison are not fulfilled, it is checked in valve testing block 115 if the valve 15 is closed.

If the valve 15 is closed, the next sensor signal is detected in detection block 103. If the valve 15 is not closed, it is checked in a second comparison unit 117 if the measurement is greater than the second reference value 10. If this condition of comparison is fulfilled, a command is issued for closing the valve (block 119), and the valve 15 is closed. Then, the next sensor signal is detected in the detection block 103.

If the second condition of comparison (measurement greater than the second reference value 10) is not fulfilled, no additional action is taken and the next sensor signal value is determined in detection block 103. Even when the command for opening the valve was given in block 113, it is checked if the second condition of comparison is fulfilled and the procedure occurs accordingly.

In the example just described, the sensor was the fill level sensor 1, with its signal being detected in detection block 103. The first condition of comparison was checking if the measurement was lower than the first reference value 8.

Of course, the sensor signal to be detected may also originate from a temperature sensor 31 which, for example, is connected to the fill level sensor 1 and directly measures the temperature of said fill level sensor 1. The process here can appear as follows, for example:

After the start of the measurement (block 101) a sensor signal is detected by a temperature sensor 31 in the detection block 103 and converted in the signal conversion block 105 into a measurement. The measurement is saved in the storage block 107. A first reference value 8, which in this case represents a first temperature limit, is entered via the first reference value block 108 and saved in the storage block 107. From the amount of the first temperature limit in first reference value block 108, a second reference value 10 is determined in second reference value block 110, which in this case is a second temperature limit. In this example the second reference value 10 shall be lower than the first temperature limit. The second reference value 10 in second reference value block 110 is also saved in storage block 107.

Now, it is checked in the first comparison unit 111 if the measurement is greater than the first temperature limit. If this is the case, the command is issued in block 113 to open the valve 15. The valve 15 is opened and the fluid 19 travels via the rinsing line 23 and the rinsing aperture 25 to the fill level sensor 1 in order to rinse it.

If the measurement is not greater than the first temperature limit 8, it is checked via the valve testing block 115 if the valve is closed or open. If the valve is closed, the next sensor signal is detected. If the valve is not closed, it is checked in the second comparison unit 117 if the measurement is lower than the second temperature limit. If this is the case the valve (block 119) is closed and the next sensor signal is detected in the detection block 103. If the measurement is not lower than the second reference value no addition actions are taken and the next signal is directly detected in the detection block 103.

This way, it can be ensured that a valve which was opened when a first temperature limit was exceed is only closed again when a second temperature limit, which is lower than the first temperature limit, has fallen below this temperature. At the temperature range at which the valve is open and the rinsing is therefore activated, a co-called hysteresis section follows, which only shuts off the rinsing process when the temperature has fallen below a second temperature limit. This way, excessive switching of the valve 15 is avoided, which causes wear and tear.

Figure 4:
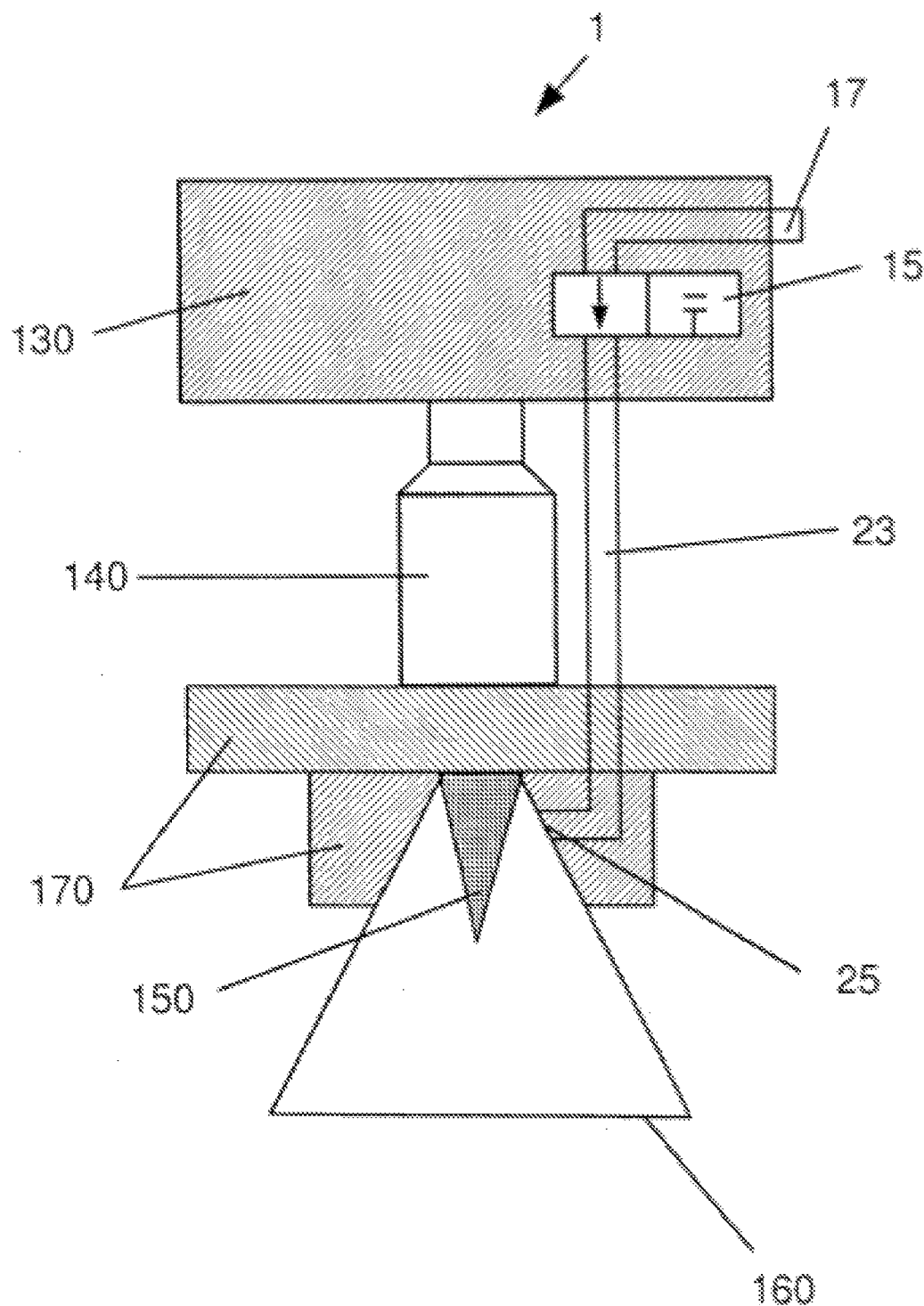
FIG. 4 is a line drawing evidencing a fill level sensor with an integrated rinsing device.

FIG. 4 shows a fill level sensor 1 with an integrated rinsing device. A transceiver 130 couples via a hollow line 140 a high-frequency pulse 39 as the transmitting signal, which is emitted downwards in a perpendicular direction via an antenna 150 and a horn antenna 160. The echo pulse 37 is received after a certain period of time by the horn antenna 160 and the antenna 150 and forwarded via the hollow line 140 to the transceiver 130 and processed there.

The antenna 150 and the horn antenna 160 may be cooled or cleaned via a rinsing aperture 25 which is connected to a rinsing line 23 guided through an antenna holder 170. The rinsing line 23 is connected to the first connection 17 for connecting a fluid 19 via the valve 15, which can be controlled by the valve control 13. The first connection 17 can be connected, for example, to the housing containing the transceiver 130. The valve 15 may also be situated in said housing or it may be connected fixed to another part of the fill level sensor 1.

When the fill level sensor 1 is to be rinsed, the valve 15 can be controlled via the valve control 13 using the control signal 14 so that the valve 15 opens and the fluid 19, connected to the first connection 17, flows via the valve 15 and the rinsing line 23 towards the rinsing aperture 25 and rinses the antenna 150 and/or the horn antenna 160. When the rinsing process has been concluded the valve 15 is closed and the flow of fluid is interrupted. This way it can be ensured that rinsing occurs only when necessary.

The invention has been explained based on preferred exemplary embodiments without being limited to these exemplary embodiments. One trained in the art will know numerous variations and embodiments of the method according to the invention as well as the device according to the invention without leaving the scope of the inventive idea. The features of individual exemplary embodiments can be arbitrarily combined or interchanged with features of other exemplary embodiments to the extent compatibility is given. In particular, a temperature sensor connected to the fill level sensor, a temperature sensor measuring the ambient temperature, or a temperature sensor measuring the temperature of the fill level sensor may also be used as a sensor for signal detection. It is additionally possible, instead of a second reference value to be compared in the second comparison unit 117, to check if a certain period of time has expired since the opening of the valve, for example, and when said period has expired the open valve is closed again.

LIST OF REFERENCE NUMBERS

Fill level sensor
2 Measuring signal
3 Signal line
5 Measurement determination device
6 Measurement
7 Comparator
8 First reference value 10 Second reference value
11 Control signal output
13 Valve control
14 Control signal
15 Valve
17 First connection
19 Fluid
21 Second connection
23 Rinsing line
25 Rinsing aperture
31 Temperature sensor
33 Time axis
35 Amplitude axis
36 Amplitude of the echo signal
37 Echo pulse
39 High-frequency pulse
40 Amplitude of the high-frequency pulse
41 Noise signal
42 Noise signal value
101 Starting block
103 Detection block
105 Signal conversion block
107 Storage block
108 First reference value block
110 Second reference value block
111 First comparison unit
113 "Open" valve
115 Valve testing block
117 Second comparison unit
119 "Close" valve
130 Transceiver
140 Hollow line
150 Antenna
160 Horn antenna
170 Antenna holder The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

I claim:

1. A fill level gauge comprising a rinsing device for rinsing a fill level sensor, further comprising a sensor for detecting a measuring signal as well as a measurement device connected to the sensor for determining a measurement from the detected measuring signal, wherein the measurement device is connected to a comparator for comparing the determined measurement with a first reference value at a predetermined condition of comparison, which comprises a control signal output for issuing a control signal, wherein the rinsing device is coupled or connected to the control signal output so that when the condition of comparison is fulfilled the control signal output transmits the control signal to the rinsing device to activate said rinsing device so that the rinsing device is activated, wherein the sensor is a fill level sensor, wherein the fill level sensor is a sensor for receiving and detecting an echo signal of a high-frequency pulse, with the measurement being a value calculated from the detected echo signal and wherein the measurement and/or the first reference value are a function of the signal/noise ratio of the echo signal.

2. The fill level gauge of claim 1, wherein the rinsing device remains activated for a predetermined period of time when the control signal is provided to activate the rinsing device at the control signal output.

3. The fill level gauge of claim 1, further comprising wherein, when the condition of comparison is fulfilled, a hysteresis is activated so that the rinsing device remains activated when the measurement is within the hysteresis range, with the hysteresis range being defined by the first reference value and a second reference value which is outside the value range in which the conditions of comparison are fulfilled.

4. The fill level gauge of claim 1, wherein the sensor is a fill level sensor.

5. The fill level gauge of claim 1, wherein the first reference value is a function of the amplitude of the high-frequency pulse emitted.

6. The fill level gauge of claim 1, wherein the first reference value and/or the second reference value are determined by an interval between the high-frequency pulse and the echo signal.

7. The fill level gauge of claim 1, wherein the first reference value and/or the second reference value are determined from an amplitude of the echo signal received at the time the fill level gauge is activated.

8. The fill level gauge of claim 1, wherein the first reference value and/or the second reference value are values determined from a saved reference echo curve.

9. The fill level gauge of claim 1, wherein the sensor is a temperature sensor for measuring a temperature of the fill level sensor.

10. The fill level gauge of claim 9, wherein the measurement is a temperature measurement and the first reference value is a first temperature limit, and further comprising wherein the control signal is provided at the control signal output when the temperature measurement is greater than the first temperature limit.

11. The fill level gauge of claim 1, wherein the rinsing device is deactivated when the temperature measured falls below a predetermined second temperature limit, which is lower or maximally equivalent to the first temperature limit.

12. The fill level gauge of claim 1, wherein a fluid being measured is gaseous, preferably nitrogen, air, or an inert gas.

13. The fill level gauge of claim 1, wherein the fluid is a cooling fluid for cooling the fill level sensor or a cleaning fluid for cleaning the fill level sensor.

14. The fill level gauge of claim 1, wherein a rinsing valve is integrated in the fill level gauge.

15. The fill level gauge of claim 1, wherein the control signal output is coupled via a wireless connection to transmit control signals to the rinsing device.

16. The fill level gauge of claim 1, further comprising wherein, when the conditions of comparison are fulfilled, several rinsing intervals are provided, with the duration of each individual rinsing interval and/or the duration of the intervals between the rinsing intervals being predetermined.

17. The fill level gauge of claim 1, wherein the rinsing device is deactivated and an error message is issued when the conditions of comparison after a predetermined number of rinsing intervals or after a predetermined rinsing duration are still fulfilled.

18. The fill level gauge of claim 1, further comprising wherein additional rinsing intervals are provided for rinsing the fill level sensor, with the duration of a rinsing process comprised of such rinsing intervals being predetermined.

19. A method for rinsing a fill level sensor with the fill level gauge of claim 1, comprising the following processing steps:
   a) Predetermination of a first reference value,
   b) Measurement of a signal with a sensor,
   c) Determination of a measurement from the signal,
   d) Comparison of a measurement with the first reference value, and
   e) Rinsing of the fill level sensor when a condition of comparison is fulfilled.

20. The method of claim 19, wherein a second reference value is determined.

21. The method of claim 20, further comprising wherein, after comparing the measurement with the first reference value, it is checked if the rinsing device is activated or deactivated, with the measurement being compared to the second reference value when the rinsing device is activated.

22. The method of claim 19, wherein the rinsing device is deactivated when the conditions of comparison are not fulfilled and either the amount of the measurement exceeds the amount of the second reference value when the amount of the second reference value is greater or equivalent to the amount of the first reference value, or when the amount of the first measurement falls below the amount of the second reference value when the amount of the second reference value is below or equivalent to the amount of the first reference value, or when a predetermined time period has expired since the activation of the rinsing device.

23. The method of claim 19, wherein the activated rinsing device is deactivated when the control signal output provides a control signal with which the rinsing device is deactivated or when the control signal output provides no control signal.

* * * * *